Aug. 23, 1938.    J. C. HOBBS    2,127,917
SEPARATOR
Original Filed Nov. 20, 1926    3 Sheets-Sheet 1
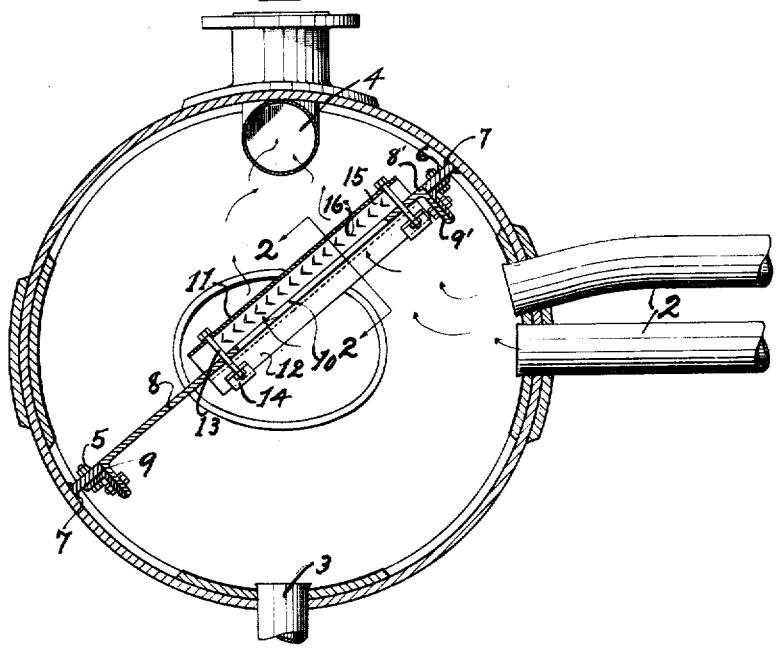
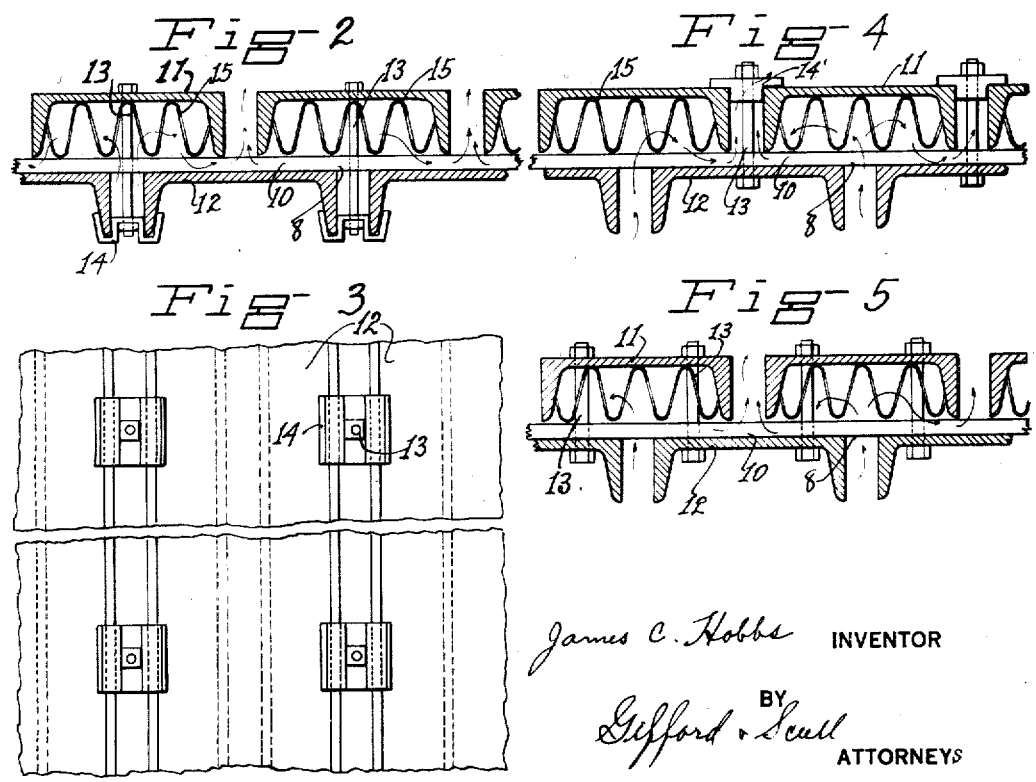
James C. Hobbs    INVENTOR
BY
Gifford & Scull    ATTORNEYS Aug. 23, 1938.  J. C. HOBBS  2,127,917
SEPARATOR
Original Filed Nov. 20, 1926  3 Sheets-Sheet 2
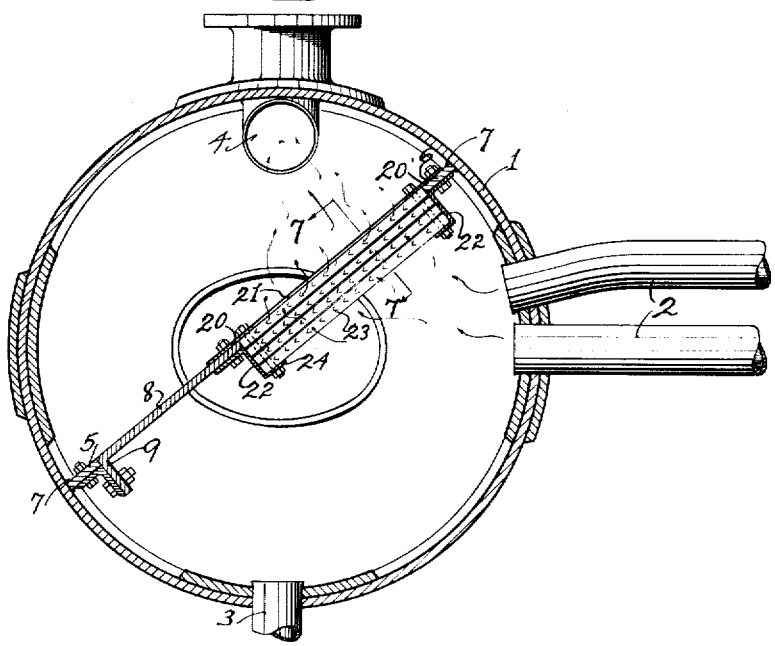
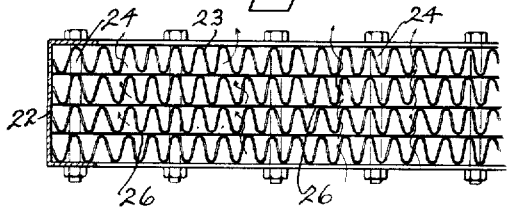
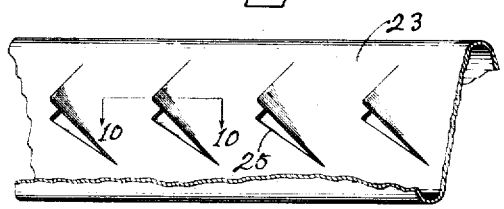
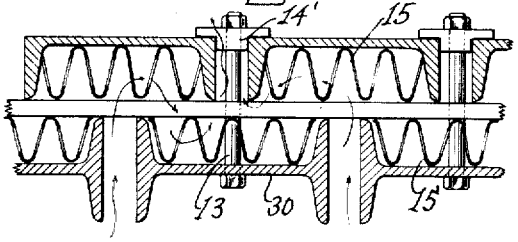
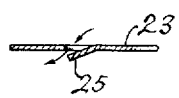
James C. Hobbs INVENTOR
BY Gifford & Scull
ATTORNEYS Aug. 23, 1938.  J. C. HOBBS  2,127,917
SEPARATOR
Original Filed Nov. 20, 1926   3 Sheets-Sheet 3
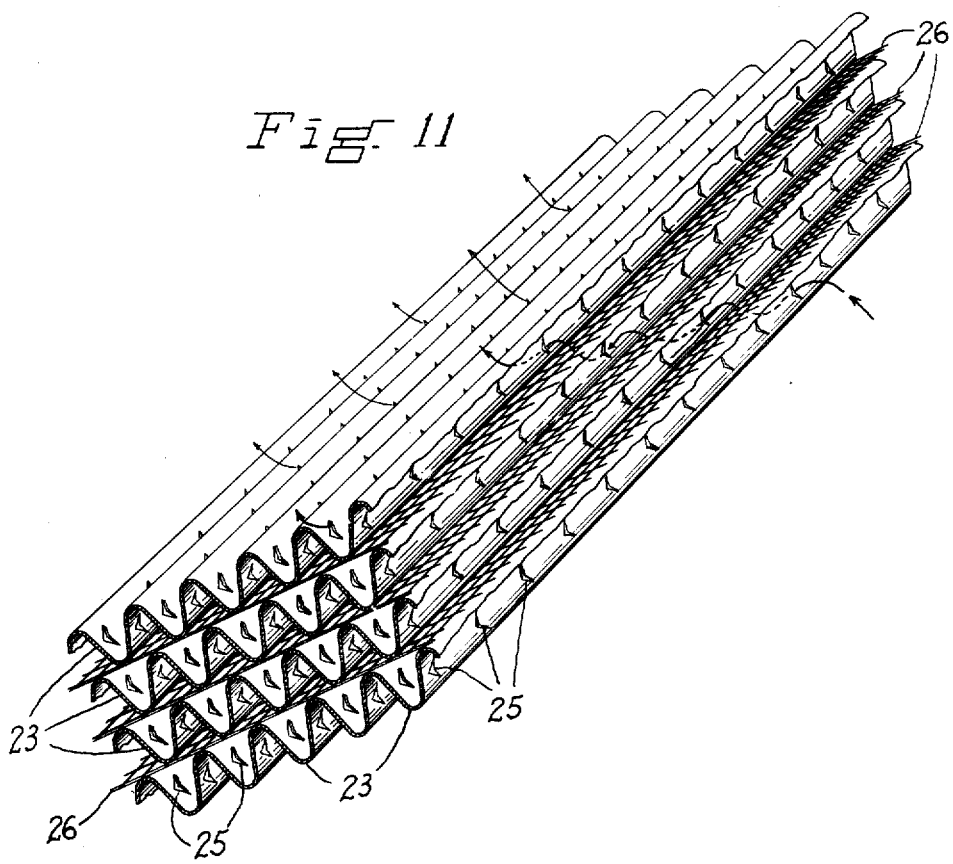
INVENTOR
James C. Hobbs
BY
ATTORNEY Patented Aug. 23, 1938

2,127,917

UNITED STATES PATENT OFFICE 2,127,917

SEPARATOR

James C. Hobbs, Painesville, Ohio

Continuation of application Serial No. 149,558, November 20, 1926. This application September 20, 1933, Serial No. 690,295

17 Claims. (Cl. 122—491)

My present invention relates in general to an improved method of and apparatus for liquid and gas separation, and more particularly, to a method of and apparatus for removing moisture from a mixture of steam and water in a steam boiler.

Apparatus heretofore devised for this purpose has been mainly characterized by baffle constructions based upon little appreciation of the fundamental laws of liquid and gas separation and due to which defective design little or no advance in separator design has occurred. Prior steam and water separators, for example, have required the wet steam to pass therethrough in a flow path in which the steam at high velocities is repeatedly directed against substantially perpendicular baffle surfaces, whereby the entrained moisture spatters on the baffle surfaces and is again picked up by the steam in a more finely divided form which is much more difficult to separate. Furthermore, prior constructions have failed to make proper provision for removal of any moisture separated from the main flow path of the steam and in such cases the moisture separated is mostly picked up by a subsequent part of the steam stream. The high pressure drop and defective performance inherent in such prior constructions have been mainly responsible for their lack of extensive use.

My present application is a continuation of my prior application, Serial No. 149,558, filed Nov. 20, 1926.

The main object of my invention is the provision of a liquid and gas separator which is characterized by its effective operation, compactness, and simplicity and relatively low cost of construction. A more specific object is the provision of a method of liquid and gas separation in which the forces of inertia, adhesion and gravity are effectively coordinated for efficiently separating the liquid and gas and rapidly removing the separated liquid. A further specific object is the provision of a separator in which all of the separating surfaces are arranged for a substantially tangential flow of gas with respect thereto and the separated liquid is caused to rapidly drop into a zone of low gas turbulence from which it is continuously removed by gravity.

The invention will be understood from the description in connection with the accompanying drawings in which Fig. 1 is a vertical section through a steam and water drum; Fig. 2 is a section taken on the line 2—2 of Fig. 1; Fig. 3 is a front view of Fig. 2; Figs. 4 and 5 are sections similar to Fig. 2 showing different modifications; Fig. 6 is a section similar to Fig. 1 showing another modification; Fig. 7 is a section taken on the line 7—7 of Fig. 6; Fig. 8 is a section similar to Fig. 2 showing another modification; Fig. 9 is a side view on an enlarged scale of a portion of one of the baffles; Fig. 10 is a section on the line 10—10 of Fig. 9; and Fig. 11 is a perspective view on an enlarged scale of the modification shown in Figs. 6 and 7, certain parts being omitted or broken away to clarify the view.

The invention is hereinafter described in connection with the separation of moisture from wet steam in a boiler steam and water drum 1 to which tubes 2 opening along one side thereof deliver a mixture of steam and water, or "wet" steam. Nipples 3 (one of which is seen in Figs. 1 and 6) lead from the bottom or water space of the drum 1 to downtake headers (not shown) in the usual manner and a dry steam pipe 4 leads from the upper part of the steam space of the drum 1 to a steam main (not shown).

A steam and water separator is positioned longitudinally of the drum 1 between the circulators 2 and the steam outlet 4 and is supported in a baffle extending diametrically of the drum and formed by metal strips 5 and 6 which are welded on the inside of the drum and extend longitudinally thereof along approximately diametrical lines as shown at 7. Angle baffle plates 8 and 8' are mounted on the strips 5 and 6 respectively by means of longitudinal flanges 9 and 9' along their edges bolted to angles carried by the strips 5 and 6. These plates 8 and 8' are spaced apart to provide an opening 10 between them. The plate 8 is preferably somewhat wider than the plate 8' so that the opening 10 will be located above the normal water level in the drum. Rows of spaced inclined channels 11 and 12 respectively are mounted on opposite sides of the plates 8 and 8' with the spaces between the channels on each side staggered relative to the spaces between the channels on the opposite side and the flanges of the channels in both rows extending in the same direction, that is, toward the side of the drum through which the mixture of steam and water enters. As shown in Figs. 2 and 3, the channels 11 and 12 are clamped to the plates 8 and 8' by means of bolts 13, saddles 14 being provided at one end of the bolts to straddle the flanges on adjacent channels 12. Corrugated thin metal strips 15 are located in each of the channels 11 between the flanges thereof with the corrugations extending parallel to the flanges. A series of openings are provided along each sinuosity or corrugation of the strips 15, as most clearly shown in Figs. 9 and 10, by striking out the metal at spaced points intermediate the height of each corrugation to make downwardly directed V-shaped openings 25 for the passage of steam. In the modification shown in Fig. 4, saddles 14' extend across the rear edges of the channels 11 to tie the channels 11 and 12 to the plates 8 and 8'.
In the modification shown in Fig. 5, the saddles are dispensed with and the bolts 13 pass through the webs of the channels 11 and 12 to retain the same in place.

In the modification shown in Figs. 6 and 7, the baffle plate 8' is dispensed with and thin plates 20 and 20' are bolted to the plate 8 and the strip 6 respectively, and are spaced apart to provide an opening 21 similar to the opening 10 in Fig. 1. Z-bar holding members 22 are bolted to the plate 8 and the strip 6, respectively, on the sides thereof opposite the plates 20 and 20'.

A plurality of sinuous or corrugated strips 23 are clamped by means of the bolts 24 between the plates 20 and 20' and the holding members 22. The strips 23 have wire screens 26 or the like interposed therebetween to prevent the strips 23 from nesting. Portions of the corrugated strips 23 are struck out to form the V-shaped openings 25 as heretofore described. The struck-up metal at each steam passage in the corrugated plate results in the formation of a series of deflecting surfaces projecting into the troughs of the corrugations along the opposite sides and intermediate the height thereof. The deflecting surfaces are arranged at a small acute angle, preferably about 7°, relative to the adjacent surface of the corrugation to cause the steam entering the corresponding opening 25 to pass downwardly along the corresponding side of the corrugation trough before passing rearwardly and upwardly to an adjacent opening 25 in the next plate.

The modification shown in Fig. 8 is similar to that shown in Fig. 1 except that the channels 12 are dispensed with and I-shaped members 30 are substituted therefor and sinuous or corrugated metal strips 15' are also installed between the rearwardly and upwardly projecting flanges of the I-beams.

In the operation of the separator constructions shown in Figs. 1-3, 4, 5 and 8, wet steam entering the drum passes between the channels 12 or I-beams 30 along the front of the separator and then into the spaces between the flanges of each channel in the rear row. The wet steam passing through each inter-channel space enters the space between two troughs of the corrugated plate and divides into two main streams, each dividing into a large number of small streams passing through deviating paths towards inter-channel spaces at opposite sides of the channel 11. Each small stream passes through an opening 25 in one of the adjacent trough walls and on entering the corresponding trough space is caused to flow downwardly for a limited extent by the inclined deflector plate at the inner side of said wall opening. The small stream then changes direction and passes out through an opening 25 in the opposite wall of the trough and repeats the flow path described until the inter-channel space is reached. Moisture is separated from the flowing steam by adhesion to the trough walls during its substantially tangential flow therealong and also by inertia on the successive changes in direction of the steam.

The arrangement of the openings 25 intermediate the height of the trough walls permits the separated moisture to drop into the bottom of each trough, which being out of the main steam path of flow, constitutes a zone of low turbulence. The arrangement of the corrugated plates at an oblique angle to the direction of flow of the entering steam, which angle is preferably such as to insure a gravity flow of the separated moisture along the bottoms of the troughs of the corrugated plates and minimize the amount of separated moisture subsequently picked up. The relatively dry steam leaving the rear or upper side of the separator passes into the space communicating with the dry steam pipe 4, through which is passes to a steam main.

The construction and steam flow in the modification shown in Figs. 6 and 7 is illustrated in detail in Fig. 11, wherein the arrows indicate the general path of flow of a stream of wet steam entering an opening 25 in the lowermost baffle. The stream is deflected downwardly along the outer wall of the trough, whereby some of the entrained moisture contacts with and adheres to the trough wall and flows down to the bottom of the trough. The relative arrangement of the openings 25 in adjacent baffle plates causes the stream to curve upwardly, as shown, and to enter an opening 25 in the superposed baffle 23 longitudinally spaced from the opening through which it passed in the lowermost baffle plate. The change in direction occurs in a vertical plane, so that moisture separated by inertia passes along the trough and rapidly drops into the low turbulence zone at the bottom of the trough. The separated moisture collects at the lower end of the separator plates until it is sufficient to overflow over the upper edge of the plate 22 into the pool in the bottom of the drum, while the dry steam passes to the outlet pipe 4.

A method of liquid and gas separation is thus provided in which the wet gas is passed through a flow path in contact with a series of relatively large liquid collecting surfaces arranged substantially tangential to the flow path. The liquid is separated by adhesion to the contacted collecting surfaces and inertia on the changes in direction of the gas stream and flows along the bottom of protected troughs by gravity to a pool in the drum, the separated liquid being out of the main path of gas flow throughout its substantially entire flow path.

While in accordance with the provisions of the the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a separator, a baffle having an opening therethrough, a plurality of members disposed on opposite sides of said baffle over said opening, the members on each side being spaced apart and those on one side being staggered with respect to those on the other side, whereby a plurality of devious paths is provided for the passage of fluid through the opening.

2. In a separator, a baffle having an opening therethrough, a plurality of members disposed on each of the opposite sides of the baffle and partially closing said opening, said members on opposite sides being staggered with respect to each other and thereby forming devious paths for the passage of a fluid through said opening, one of said members having flanges extending toward said baffle, and a corrugated sheet disposed between said flanges with the corrugations running parallel thereto, and perforated for the passage of fluid.

3. In a separator, a baffle having an opening therethrough, and a plurality of members disposed on each of the opposite sides of the baffle and partially closing said opening, said members on opposite sides being staggered with respect to each other and thereby forming devious paths for the passage of a fluid through said opening, one of said members having flanges extending toward the baffle.

4. In a separator, means forming a path for a fluid passing through the separator, a corrugated sheet disposed in said path with the length of the corrugations extending transversely to the direction of travel of the fluid, said corrugations having perforations therein through which the fluid may pass, and deflectors disposed adjacent said perforations and inclined to the surfaces of the corrugations in which the perforations occur and lengthwise of said corrugations, whereby fluid passing through the perforations is caused to pass along said surfaces.

5. In a separator, means forming a path for a fluid passing through the separator, a corrugated sheet disposed in said path with the length of the corrugations extending transversely to the direction of travel of the fluid, said corrugations having perforations therein through which the fluid may pass, and deflectors disposed adjacent said perforations and inclined to the surfaces of the corrugations in which the perforations occur and lengthwise of said corrugations, whereby fluid passing through the perforations is caused to pass along said surfaces, said deflectors being formed of metal struck up from the corrugations to form the perforations.

6. In a separator, means forming a path for a fluid passing through the separator, a corrugated sheet disposed in said path with the length of the corrugations extending transversely to the direction of travel of the fluid, said corrugations having perforations therein through which the fluid may pass and being inclined lengthwise, whereby liquid separated from the fluid may drain along said corrugations, and deflectors disposed adjacent said perforations and inclined to the surfaces of the corrugations in which the perforations occur, said deflectors being constructed to deflect fluid issuing from the perforations downwardly along the inclined sides of said corrugations.

7. In a separator, means forming a path for a fluid passing through the separator, a corrugated sheet disposed in said path with the length of the corrugations extending transversely to the direction of travel of the fluid, said corrugations having perforations therein through which the fluid may pass and being inclined lengthwise, whereby liquid separated from the fluid may drain along said corrugations, and deflectors disposed adjacent said perforations and inclined to the surfaces of the corrugations in which the perforations occur, whereby fluid passing through the perforations is caused to pass along said surfaces, said deflectors being formed of metal struck up from the corrugations to form the perforations with the free edges of the deflectors disposed at the lower end thereof, whereby the fluid will be deflected downwardly along said inclined surfaces.

8. In a separator for separating the liquid and gas in a stream of mixed liquid and gas, a series of extended surfaces placed one after the other along the general path followed by said stream, all of said surfaces being arranged at substantially the same small acute angle with respect to the direction of flow of said stream, said angle being of such a value that said stream will pass along each of said surfaces in the same direction and substantially tangent thereto upon meeting it and thereby have extended contact therewith to cause the liquid to adhere thereto, one end of each surface being higher than the other, whereby particles of liquid adhering thereto may run down said surface.

9. The method of separating a liquid from a wet gas which comprises passing the wet gas substantially tangentially along a series of liquid collecting surfaces of substantial area in substantially the same direction and without impinging on any collecting surface in its flow path at an abrupt angle, collecting the separated liquid on surfaces out of the main path of gas flow, and removing the separated liquid from the last mentioned surfaces by gravity.

10. In a steam and water drum having steam and water tubes connected thereto along one side thereof and a steam outlet in its upper side, a baffle plate extending from the drum wall intermediate said tubes and steam outlet to a level below the normal water level in said drum and having an opening therein above the normal water level, and a steam and water separator positioned in said opening and comprising a plurality of side-by-side corrugated plates arranged to form moisture collecting surfaces.

11. In a steam and water drum having steam and water circulators connected thereto along one side thereof and a steam outlet in its upper side, a baffle plate extending from the drum wall intermediate said circulators and steam outlet to a level below the normal water level in said drum and having an opening therein above the normal water level, and a steam and water separator positioned in said opening and comprising a plurality of side-by-side substantially parallel corrugated plates having steam passages therebetween and arranged to form extended moisture collecting surfaces.

12. In a boiler, the combination with a steam and water drum and boiler tubes delivering thereinto, of a water removing device including a screen inclined between the vertical and horizontal and having spaced vertically extending wires, said device being disposed within the drum so as to have the discharge of the tubes impinge on the screen in a generally downward direction and at an angle between a right and a straight angle.

13. In a boiler, the combination with a steam and water drum and boiler tubes delivering thereinto, of a water removing screen device within the drum, said device being so arranged with relation to the tubes that the discharge of the tubes impinges on the screen at an angle substantially less than a right angle.

14. In a steam boiler, the combination with a steam and water drum and boiler tubes delivering thereinto, of a moisture separating device within the drum comprising a plurality of wire screens spaced apart transversely of said drum, said device being so arranged with relation to said boiler tubes that the discharge from said boiler tubes impinges on said device at an angle substantially less than a right angle.

15. In a steam boiler, the combination with a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and comprising a plurality of wire screens spaced apart transversely of said drum and having vertically extending wires arranged at an inclination between the horizontal and vertical towards said boiler tubes.

16. In a steam boiler, the combination of a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and comprising a plurality of parallel wire mesh screens, and means for holding said screens spaced apart transversely of said drum and at an inclination between the horizontal and vertical towards said boiler tubes.

17. In a steam boiler, the combination with a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and so arranged with relation to said boiler tubes that the discharge from said boiler tubes impinges on said device at an angle substantially less than a right angle, said device comprising a plurality of inclined wire mesh screens spaced apart transversely of said drum.

JAMES C. HOBBS.

CERTIFICATE OF CORRECTION.

Patent No. 2,127,917. August 23, 1938.

JAMES C. HOBBS.

It is hereby certified that error appears in the printed specification of the above numbered patent requiring correction as follows: Page 2, second column, line 16, for the word "is" read it; line 74, claim 2, for "the" before "baffle" read said; and line 75, same claim, for "said" before "members" read the; page 3, first column, line 10, claim 3, for "the" before "baffle" read said; and line 11, same claim, for "said" before "members" read the; same page, second column, lines 38 and 41, claim 11, for "circulators" read tubes; and that the said Letters Patent should be read with this correction therein that the same may conform to the record of the case in the Patent Office.

Signed and sealed this 22nd day of November, A. D. 1938.

Henry Van Arsdale (Seal)   Acting Commissioner of Patents.

15. In a steam boiler, the combination with a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and comprising a plurality of wire screens spaced apart transversely of said drum and having vertically extending wires arranged at an inclination between the horizontal and vertical towards said boiler tubes.

16. In a steam boiler, the combination of a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and comprising a plurality of parallel wire mesh screens, and means for holding said screens spaced apart transversely of said drum and at an inclination between the horizontal and vertical towards said boiler tubes.

17. In a steam boiler, the combination with a horizontally arranged steam and water drum having a steam outlet in the upper part thereof and boiler tubes delivering thereinto along one side thereof, of a moisture separating device extending longitudinally of the steam space of said drum in the path of flow between said boiler tubes and steam outlet and so arranged with relation to said boiler tubes that the discharge from said boiler tubes impinges on said device at an angle substantially less than a right angle, said device comprising a plurality of inclined wire mesh screens spaced apart transversely of said drum.

JAMES C. HOBBS.

CERTIFICATE OF CORRECTION.

Patent No. 2,127,917.     August 23, 1938.

JAMES C. HOBBS.

It is hereby certified that error appears in the printed specification of the above numbered patent requiring correction as follows: Page 2, second column, line 16, for the word "is" read it; line 74, claim 2, for "the" before "baffle" read said; and line 75, same claim, for "said" before "members" read the; page 3, first column, line 10, claim 3, for "the" before "baffle" read said; and line 11, same claim, for "said" before "members" read the; same page, second column, lines 38 and 41, claim 11, for "circulators" read tubes; and that the said Letters Patent should be read with this correction therein that the same may conform to the record of the case in the Patent Office.

Signed and sealed this 22nd day of November, A. D. 1938.

Henry Van Arsdale (Seal)                      Acting Commissioner of Patents.